Oct. 28, 1952 P. J. CULICETTO 2,615,999

VOLUME CONTROL APPARATUS

Filed July 26, 1950 2 SHEETS—SHEET 1

INVENTOR.
Peter J. Culicetto
BY

Oct. 28, 1952 P. J. CULICETTO 2,615,999

VOLUME CONTROL APPARATUS

Filed July 26, 1950 2 SHEETS—SHEET 2

INVENTOR.

Peter J. Culicetto

BY

Patented Oct. 28, 1952 2,615,999

UNITED STATES PATENT OFFICE 2,615,999

VOLUME CONTROL APPARATUS

Peter J. Culicetto, West New Brighton, N. Y.

Application July 26, 1950, Serial No. 175,901

11 Claims. (Cl. 179—171)

This invention releases to volume control apparatus and has for its primary object the provision of improved apparatus for modifying the volume range of signals.

Music and speech before they are impressed upon a radio transmitter or upon recording apparatus may have a rather wide range of volume levels. Consequently it is necessary to compress such volume range to avoid over-modulation with its consequent signal distortion. On the other hand, when such volume range has been compressed to avoid the aforesaid disadvantage, it is desirable to restore the original volume range as near as possible to that of the original music or speech at the time of the transmission or recording of the same. In accordance with one embodiment of the invention, the apparatus may be utilized to compress the original volume range of music or speech and when designed for such use, the apparatus may be designated as a volume compressor. When the apparatus is designed for use in restoring the compressed volume range to its original condition it may be termed a volume expander.

Another object of the invention is to provide a volume range modifying apparatus which automatically functions as a volume compressor or expander.

A further object of my invention is to provide a volume expander circuit and a volume compressor circuit applicable to either single-ended or push-pull operation.

Still another object of my invention is to provide a volume expander circuit and a volume compressor circuit which are entirely resistance capacitance coupled. This method of coupling permits a much wider frequency range to be covered together with a minimum amount of signal distortion, as compared to the performance with transformer coupling. By eliminating transformer coupling, the possibility of introducing hum into the system is also greatly reduced, along with the cost of the apparatus.

A still further object of my invention is to provide a resistance capacitance coupled volume expander and a resistance capacitance coupled volume compressor circuit the use of which, at maximum input signal levels, results in a total harmonic distortion whose value is of the same order as that normally found in a properly designed resistance capacitance coupled amplifier.

A still further object of my invention is to provide apparatus of the indicated type which is comparatively inexpensive, non-critical in adjustment, and compact in design.

Other objects of my invention, as well as the advantages and details of construction thereof, will be set forth hereinafter or will be apparent to those skilled in the art upon reading this specification, wherein I set forth certain exemplary embodiments of my invention. Reference is made to the drawings wherein.

Figure 1:
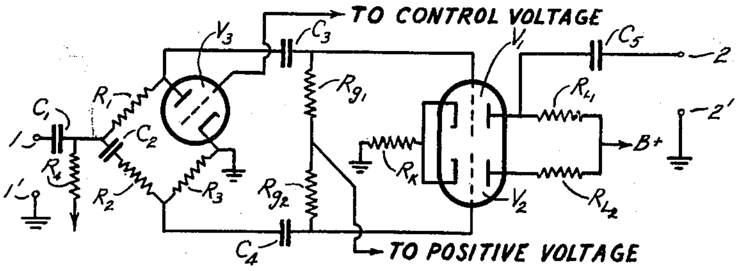
Figure 1 illustrates the fundamental circuit embodied in my volume range modifying apparatus when used either as a volume expander or a volume compressor.

In the circuit shown in Figure 1 of the drawings, there is included a Wheatstone bridge consisting of four arms, composed of fixed resistances $R_1$, $R_2$ and $R_3$ and electron tube $V_3$, the latter serving as the fourth resistance arm of the bridge. The Wheatstone bridge also contains a capacitor $C_2$ which functions as a block for the direct current in the arm formed by $R_2$. Plate voltage for $V_3$ is obtained through $R_4$, one end of which is connected to the junction of $R_1$ and $C_2$ and whose purpose is to avoid shunting to ground through the power supply the input signal applied at terminals 1, 1′. A direct current blocking capacitor $C_1$ is interposed between the terminal 1 and the junction of $R_1$ and $C_2$. The junction of $R_3$ and the cathode of electron tube $V_3$ is brought to ground. The junction of $R_1$ and the plate of $V_3$ is connected through a D. C. blocking capacitor $C_3$ to the control grid of triode $V_1$. The junction of $R_2$ and $R_3$ is connected through a D. C. blocking capacitor, $C_4$, to the control grid of triode $V_2$. Although electron tubes $V_1$ and $V_2$ need not be of the same type or have the same characteristics, it is more practical to use a dual low mu triode tube such as the tube known as type 6SN7. The cathodes of $V_1$ and $V_2$ are connected together and grounded through a resistor $R_k$. As in the preferred practice of my invention, $R_k$ is of the order of 10,000 ohms, in order to restore proper operating bias to the control grids of electron tubes $V_1$ and $V_2$, the junction of grid resistors $R_{g_1}$, and $R_{g_2}$ must be returned to a suitable source of positive potential of appropriate value, such as for example the source of positive potential shown in Figure 2 of the drawings. Resistors $R_{L_1}$ and $R_{L_2}$ are plate load resistors for triodes $V_1$ and $V_2$ respectively. Signal output is obtained at terminals 2, 2'. Capacitor $C_5$ is for D. C. blocking.

In order to operate this circuit as a volume expander, the control grid of $V_3$ is initially unbiased. At this time, the plate resistance of $V_3$ is at a low value. The purpose of tubes $V_1$ and $V_2$ is to provide an output voltage at the anode of $V_1$ which depends upon the difference in voltage drop across $R_3$ and the drop across $V_3$, accomplished by virtue of the common cathode resistor $R_k$. The action of the common cathode resistor is to introduce an additional voltage in the cathode circuit of $V_1$ when a signal voltage is applied to the control grid of $V_2$. If $V_2$ were absent, the voltage appearing between grid and cathode of tube $V_1$ would be the input voltage applied between the control grid of $V_1$ and ground, less the voltage drop occurring across the cathode resistor. The total voltage drop occurring across the cathode resistor is increased by employing this same cathode resistor in the cathode circuit of a second tube, $V_2$. By controlling the intensity of the signal applied to the control grid of $V_2$, (applied in the same phase as that applied to the control grid of $V_1$) sufficient additional voltage drop across the cathode resistor may be obtained so that the resultant grid to cathode signal at tube $V_1$ may be varied or even made zero. Thus, the output of $V_1$ may be initially set as desired. It must be added that balancing the bridge by making $R_1 \times R_3 = R_2 \times V_3$ does not result in zero output signal at the anode of $V_1$ as it would be in the usual case where a transformer is connected with one primary terminal at the junction of $R_1$ and plate of $V_3$, and the other at the junction of $R_2$ and $R_3$ with the transformer secondary completing the output circuit. If the signal level at the control grid of $V_2$ is adjusted so that before expansion the output of $V_1$ is at some low value, dependent upon the degree of expansion desired, then during the expansion period the plate resistance of $V_3$ is increasing due to an increase in the applied bias on the control grid of $V_3$. This bias is obtained by rectifying a portion of the input signal. Therefore, the voltage drop across this arm of the bridge will increase in greater proportion than the drop across $R_3$ since the value of this resistor remains fixed. The result will be an increase in the grid to cathode voltage of $V_1$ with a consequent increase in output signal level, greater in proportion than the increase in input signal level, or in other words, expander action.

In operating the circuit of Figure 1 as a volume compressor, the control grid of $V_3$ is initially biased to cut-off or near cut-off with a pre-determined voltage. At this time, the plate resistance of $V_3$ is at a high value. Again, the purpose of tubes $V_1$ and $V_2$ is to provide an output voltage at the anode of $V_1$ which depends upon the difference in voltage drop across $R_3$ and that across $V_3$. As the bias on the control grid of $V_3$ is made to decrease inversely as the intensity of the signal appearing at the output terminals by rectifying a portion of the output signal and applying this voltage in opposition to the applied bias, the plate resistance of this tube will decrease with an increase in output signal level, and hence, the drop across this arm of the bridge will not increase as much as it would if the plate resistance of $V_3$ remained fixed. Therefore, the difference between these two voltages will not materially increase, with the result that the intensity of the output tube $V_1$ remains within rather narrow limits for large increases in input signal level.

Figure 2:
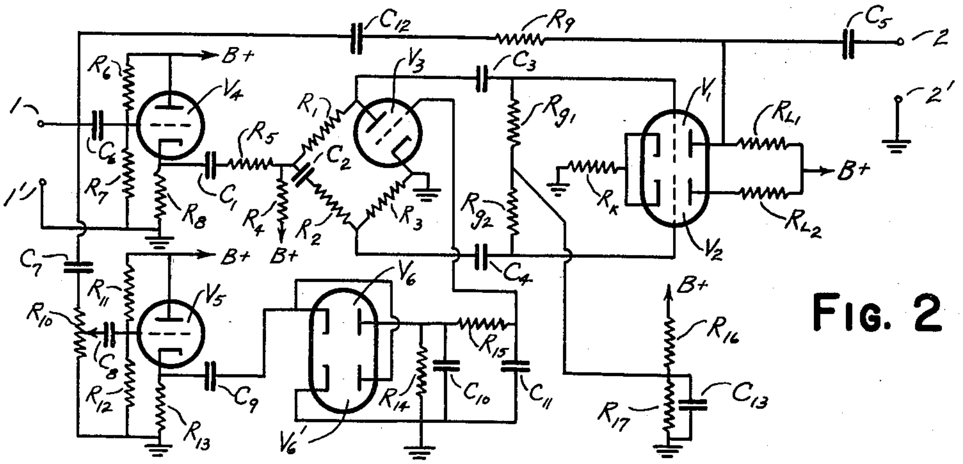
Figure 2 is a diagram of a volume expander circuit made in accordance with the invention and embodying the fundamental circuit shown in Figure 1.

Figure 2 shows a single ended volume expander incorporating the fundamental circuit of Figure 1 with provision for biasing the control grids of triodes $V_1$ and $V_2$ and a means of obtaining the D. C. expansion control voltage for the control grid of tube $V_3$. In this circuit, tube $V_4$ is connected as a cathode follower tube. Resistor $R_8$ is connected between the cathode of $V_4$ and ground. Resistors $R_6$ and $R_7$, connected in series between the plate of tube $V_4$ and ground, form a voltage divider so proportioned that with the control grid of $V_4$ connected to their junction, proper operating bias, as measured between control grid and the cathode of $V_4$ is obtained. Resistor $R_5$ is connected between the junction of $R_1$, $C_2$ and $R_4$ and one side of $C_1$ the other side of which is connected to the cathode of $V_4$. The purpose of $R_5$ is to reduce loading on tube $V_4$. One end of negative feedback resistor $R_9$ is connected to the plate of $V_1$ and the other end of this resistor is connected to one end of a D. C. blocking capacitor $C_{12}$, the other end of the latter being connected to the input side of $C_6$. The primary purpose of using negative feedback is to straighten the expansion characteristic. However, in some applications, it may be omitted, if desired. $R_{10}$ controls the degree of expansion provided by the circuit. Control $R_{10}$ is a continuously variable potentiometer having one end connected to the input terminal 1, through D. C. blocking capacitor $C_7$, and having its other end grounded. The arm of $R_{10}$ is connected to one side of the D. C. blocking capacitor $C_8$, the other side of which is connected to the junction of resistors $R_{11}$ and $R_{12}$. To this junction is also connected the control grid of tube $V_5$. Tube $V_5$, with resistors $R_{11}$, $R_{12}$ and $R_{13}$ form a cathode follower circuit similar to that of $V_4$. Capacitor $C_9$, serving as part of the voltage doubler circuit, has one side connected to the cathode of $V_5$ and its other side connected to a twin diode tube $V_6$, $V_6'$. The diode tube which may be of any suitable type such as the type known as 6H6, is connected as a voltage doubler, as shown, from which a negative voltage with respect to ground is obtained. Resistor $R_{14}$ serves to complete the D. C. path. Resistor $R_{15}$ and capacitor $C_{11}$ determine the time constants for the expander. The output voltage obtained at the junction of $R_{15}$ and $C_{11}$ is then applied to the grid of tube $V_3$. Proper bias for the grids of $V_1$ and $V_2$ is obtained by connecting the junction of grid resistors $R_{g_1}$ and $R_{g_2}$ to the voltage divider composed of $R_{16}$ and $R_{17}$, the latter being shunted by a capacitor $C_{13}$, of suitable value so as to avoid any signal voltage drop appearing across this section of the divider. The free end of $R_{16}$ is connected to the positive side of the plate power supply while the free end of $R_{17}$ is grounded.

Figure 3:
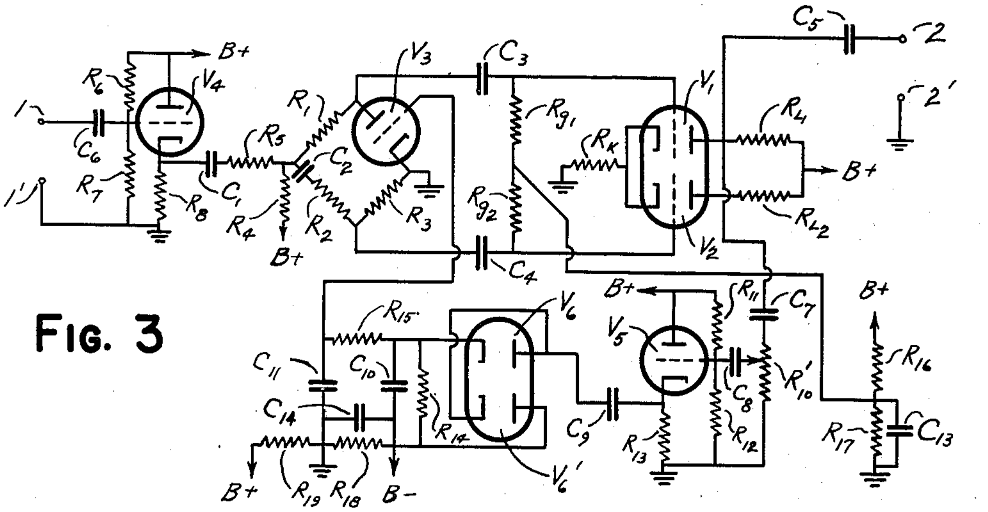
Figure 3 is a diagram of a compressor circuit made in accordance with the invention and in which is incorporated the fundamental circuit of Figure 1.

Figure 3 shows a single ended volume compressor incorporating the fundamental circuit of Figure 1 and includes means for biasing the control grids of triodes $V_1$ and $V_2$, a means for biasing the control grid of $V_3$ to cut-off, and a means of obtaining the D. C. compression control voltage for the control grid of $V_3$. In this circuit, the input signal for the control grid of $V_5$ is obtained from the output of the compressor, that is, the plate of $V_1$. The resistors and capacitors in the circuit of Figure 3 having designations similar to those in the circuit of Figure 2, perform the same functions in the circuit of Figure 3. However, in the circuit of Figure 3, tubes $V_6$ and $V_6'$ are connected as a voltage doubler whose output voltage is positive with respect to ground. A negative voltage to cut-off the plate current of tube $V_3$ is obtained through voltage divider $R_{18}$ and $R_{19}$. The junction of these two resistors $R_{18}$ and $R_{19}$ is connected to ground. The other end of $R_{18}$ is connected to the negative side of the B supply, while the other end of $R_{19}$ is connected to the positive side of the B supply. $R_{18}$ is by-passed by capacitor $C_{14}$. The junction of $R_{18}$, one side of $C_{14}$ and the negative side of the B supply is connected to the plate of $V_6'$ in the manner shown. This is not the only method of obtaining this bias voltage as is known to those skilled in the art. A separate bias supply may be used instead. Negative feedback is not used, therefore, $R_9$ and $C_{10}$ of the circuit in Figure 2, are omitted. Potentiometer $R_{10}'$ serves as a compression control.

Figure 4:
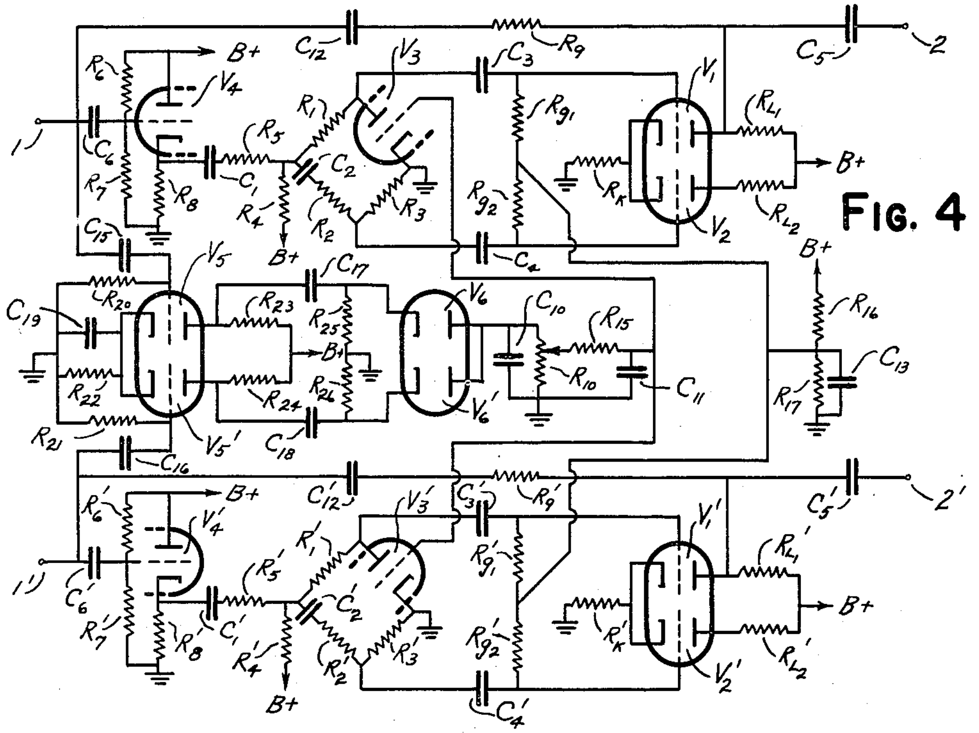
Figure 4 shows a circuit arrangement embodying the principles of the circuit of Figure 1, but applied in a push-pull volume expander circuit.

Figure 4 shows a push-pull volume expander incorporating the fundamental circuit of Figure 1. The circuitry for $V_1$, $V_2$, $V_1'$, $V_2'$, $V_3$, $V_3'$ and $V_4$, $V_4'$ is the same as that shown in Figure 2. However, the circuit for the source of D. C. control voltage for the grids of $V_3$ and $V_3'$, has been modified. Tube $V_5$, with $V_5'$, is a dual triode connected as a conventional push-pull resistance capacitance coupled amplifier having grid resistors $R_{20}$ and $R_{21}$ and common cathode resistor $R_{22}$ by-passed with $C_{19}$. Capacitors $C_{15}$ and $C_{16}$ serve for D. C. blocking. The control grid of $V_5$ is connected to input terminal 1 through $C_{15}$ and the control grid of $V_5'$ is connected to input terminal 1' through $C_{16}$. The push-pull output of $V_5$ and $V_5'$ is connected through blocking capacitors $C_{17}$ and $C_{18}$ to the twin diode $V_6$ and $V_6'$ connected as a full-wave rectifier as shown. Resistors $R_{23}$ and $R_{24}$ are plate load resistors for $V_5$ and $V_5'$ respectively. Resistors $R_{25}$ and $R_{26}$ serve to complete the D. C. path for $V_6$ and $V_6'$. Potentiometer $R_{10}$ controls the degree of expansion. Push-pull output voltage is obtained at terminals 2, 2'.

Figure 5:
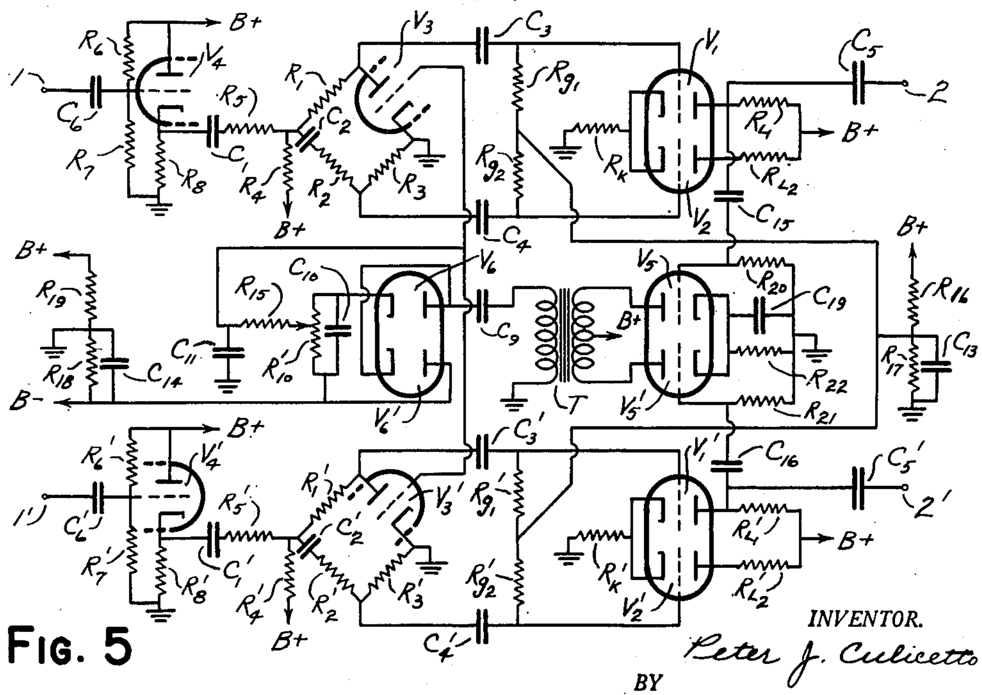
Figure 5 shows a circuit arrangement embodying the principles of the circuit of Figure 1 applied in a push-pull volume compressor circuit.

Figure 5 shows a push-pull volume compressor incorporating the fundamental circuit of Figure 1. The circuitry for $V_1$, $V_2$, $V_1'$, $V_2'$, $V_3$, $V_3'$, $V_4$ and $V_4'$ is the same as that in Figure 3. The circuit shown in Figure 5 for the source of positive D. C. compressor control voltage for the grids of $V_3$, $V_3'$ is illustrative of one of the many different methods known to the art for obtaining D. C. control voltage and may be replaced by one of such known methods or one similar to that of Figure 4. Here, triodes $V_5$ and $V_5'$ are connected in a conventional push-pull circuit having grid resistors $R_{20}$ and $R_{21}$ and common cathode resistor $R_{22}$ by-passed with $C_{19}$. Capacitors $C_{15}$ and $C_{16}$ serve for D. C. blocking. The control grid of $V_5$ is connected to the plate of $V_1$ through capacitor $C_{15}$ and the control grid of $V_5'$ is connected to the plate of $V_1'$ through capacitor $C_{16}$. The output of $V_5$ and $V_5'$ is obtained through transformer T, the primary of which is connected to the plates of $V_5$ and $V_5'$, as shown, while one side of the secondary is grounded. The other side of the secondary is connected through $C_9$ to the plate of the diode $V_6$ which, together with $V_6'$ constitutes a voltage doubler, whose output voltage is positive with respect to ground. $R_{10}'$ serves as a D. C. return path and compressor control.

While I have described my invention in certain prefered embodiments, it will be understood by those skilled in the art that various changes and modifications may be made without departing from the spirit or scope of the invention and it is not my intention that my invention be limited to the precise circuit arrangement or the audio frequency range alone, but that my invention shall be construed to cover various modifications of the circuits illustrated and various frequencies including radio frequencies within the scope of the appended claims.

What I claim as new and desire to secure by Letters Patent of the United States is as follows:

1. A circuit for compressing or expanding the volume range of signals comprising a Wheatstone bridge having one arm composed of a tube with its cathode grounded and having its three other arms composed of resistors, the cathode of said tube and the resistor junction directly opposite thereto constituting the input terminals of the circuit, means for amplifying and rectifying a portion of the signal and for impressing such rectified voltage upon the control grid of said tube so as to vary the plate resistance of said tube proportionately to the intensity of such signal, a pair of tubes cathode coupled through a common resistor, means for feeding the signal taken from the anode of said first mentioned tube to the control grid of one of said cathode coupled tubes, means for feeding the signal taken from the resistor junction of said bridge directly opposite the anode of said first mentioned tube to the control grid of the other of said cathode coupled tubes, and means for taking the signal output from the anode of the cathode coupled tube whose control grid is connected to the anode of the first-mentioned tube.

2. A volume expander comprising a Wheatstone bridge having one arm composed of a tube with its cathode grounded and having its three other arms composed of resistors, the cathode of said tube and the resistor junction directly opposite thereto constituting the input terminals of the circuit, means for amplifying and rectifying a portion of the input signal, means for impressing such rectified voltage upon the control grid of said tube so as to vary the plate resistance of said tube in accordance with the intensity of such signal, a pair of tubes cathode coupled through a common resistor, means for feeding the signal taken from the anode of said first mentioned tube to the control grid of one of said cathode coupled tubes, means for feeding the signal taken from the resistor junction of said bridge directly opposite the anode of said first mentioned tube to the control grid of the other of said cathode coupled tubes, and means for taking the signal output from the anode of the cathode coupled tube whose control grid is connected to the anode of the first mentioned tube.

3. A volume expander comprising a Wheatstone bridge having one arm composed of a tube with its cathode grounded and having its three other arms composed of resistors, the cathode of said tube and the resistor junction directly opposite thereto constituting the input terminals of the circuit, means for amplifying and rectifying a portion of the input signal, means for impressing such rectified voltage upon the control grid of said tube so as to vary the plate resistance of said tube in accordance with the intensity of such signal, a pair of tubes cathode coupled through a common resistor, means for feeding the signal taken from the anode of said first mentioned tube to the control grid of one of said cathode coupled tubes, means for feeding the signal taken from the resistor junction of said bridge directly opposite the anode of said first mentioned tube to the control grid of the other of said cathode coupled tubes, means for taking the signal output from the anode of the cathode coupled tube whose control grid is connected to the anode of the first mentioned tube, and means for suitably applying negative feedback between the output and input terminals.

4. A volume expander comprising a Wheatstone bridge having one arm composed of a tube with its cathode grounded and having its three other arms composed of resistors, the cathode of said tube and the resistor junction directly opposite thereto constituting the input terminals of the bridge, a cathode follower input circuit for applying a signal at said bridge input terminals, means for amplifying and rectifying a portion of the input signal, means for impressing such rectified voltage upon the control grid of said tube so as to vary the plate resistance of said tube in accordance with the intensity of such signal, a pair of tubes cathode coupled through a common resistor, means for feeding the signal taken from the anode of said first mentioned tube to the control grid of one of said cathode coupled tubes, means for feeding the signal taken from the resistor junction of said bridge directly opposite the anode of said first mentioned tube to the control grid of the other of said cathode coupled tubes, and means for taking the signal output from the anode of the cathode coupled tube whose control grid is connected to the anode of the first mentioned tube.

5. A volume compressor comprising a Wheatstone bridge having one arm composed of a tube with its cathode grounded and having its three other arms composed of resistors, the cathode of said tube and the resistor junction directly opposite thereto constituting the input terminals of the circuit, means for amplifying and rectifying a portion of the output signal, means for impressing such rectified voltage upon the control grid of said tube in opposition to a pre-determined bias potential applied to the control grid of said tube so as to vary its plate resistance inversely with the intensity of such signal, a pair of tubes cathode coupled through a common resistor, means for feeding the signal taken from the anode of said first mentioned tube to the control grid of one of said cathode coupled tubes, means for feeding the signal taken from the resistor junction of said bridge directly opposite the anode of said first mentioned tube to the control grid of the other of said cathode coupled tubes, and means for taking the signal output from the anode of the cathode coupled tube whose control grid is connected to the anode of the first mentioned tube.

6. A volume compressor comprising a Wheatstone bridge having one arm composed of a tube with its cathode grounded and having its three other arms composed of resistors, the cathode of said tube and the resistor junction directly opposite thereto constituting the input terminals of the bridge, a cathode follower input circuit for applying a signal at said bridge input terminals, means for amplifying and rectifying a portion of the output signal, means for impressing such rectified voltage upon the control grid of said tube in opposition to a pre-determined bias potential applied to the control grid of said tube so as to vary its plate resistance inversely with the intensity of such signal, a pair of tubes cathode coupled through a common resistor, means for feeding the signal taken from the anode of said first mentioned tube to the control grid of one of said cathode coupled tubes, means for feeding the signal taken from the resistor junction of said bridge directly opposite the anode of said first mentioned tube to the control grid of the other of said cathode coupled tubes, and means for taking the signal output from the anode of the cathode coupled tube whose control grid is connected to the anode of the first mentioned tube.

7. A push-pull volume expander comprising two Wheatstone bridge circuits each bridge having one arm composed of a tube with its cathode grounded and having its three other arms composed of resistors, each input terminal being constituted by the resistor junction directly opposite said cathode in each bridge circuit, means for amplifying and rectifying a portion of the push-pull input signal, means for impressing such rectified voltage upon the control grid of said tubes so as to vary the plate resistance of both tubes in accordance with the intensity of such signal, a pair of tubes cathode coupled through a common resistor, means for feeding the signal taken from the anode of the tube in one of said Wheatstone bridge circuits to the control grid of one of said cathode coupled tubes, means for feeding the signal taken from the resistor junction opposite the anode of the tube in said bridge to the control grid of the other of said cathode coupled tubes, and means for taking the signal output from the anode of the cathode coupled tube whose control grid is connected to the anode of the tube in said bridge circuit, the second Wheatstone bridge being connected to two more cathode coupled tubes in the same manner as the first Wheatstone bridge and its associated cathode coupled tubes, thus providing a second output terminal which together with the first output terminal provide push-pull signal output.

8. A push-pull volume expander comprising two Wheatstone bridge circuits each bridge having one arm composed of a tube with its cathode grounded and having its three other arms composed of resistors, each input terminal being constituted by the resistor junction directly opposite said cathode in each bridge circuit, means for amplifying and rectifying a portion of the push-pull input signal, means for impressing such rectified voltage upon the control grid of said tubes so as to vary the plate resistance of both tubes in accordance with the intensity of such signal, a pair of tubes cathode coupled through a common resistor, means for feeding the signal taken from the anode of the tube in one of said Wheatstone bridge circuits to the control grid of one of said cathode coupled tubes, means for feeding the signal taken from the resistor junction opposite the anode of the tube in said bridge to the control grid of the other of said cathode coupled tubes, and means for taking the signal output from the anode of the cathode coupled tube whose control grid is connected to the anode of the tube in said bridge circuit, the second Wheatstone bridge being connected to two more cathode coupled tubes in the same manner as the first Wheatstone bridge and its associated cathode coupled tubes, thus providing a second output terminal which together with the first output terminal provide push-pull signal output, means for suitably applying negative feedback between the output and input terminals.

9. A push-pull volume expander comprising two identical Wheatstone bridge circuits each bridge having one arm composed of a tube with its cathode grounded and having its three other arms composed of resistors, each input terminal being constituted by the resistor junction directly opposite said cathode in each bridge circuit, two cathode follower circuits for applying a signal at each of said bridge input terminals, means for amplifying and rectifying a portion of the push-pull input signal, means for impressing such rectified voltage upon the control grid of said tubes so as to vary the plate resistance of both tubes in accordance with the intensity of such signal, a pair of tubes cathode coupled through a common resistor, means for feeding the signal taken from the anode of the tube in one of said Wheatstone bridge circuits to the control grid of one of said cathode coupled tubes, means for feeding the signal taken from the resistor junction opposite the anode of the tube in said bridge to the control grid of the other of said cathode coupled tubes, and means for taking the signal output from the anode of the cathode coupled tube whose control grid is connected to the anode of the tube in said bridge circuit, the second Wheatstone bridge being connected to two more cathode coupled tubes in the same manner as the first Wheatstone bridge and its associated cathode coupled tubes, thus providing a second output terminal which together with the first output terminal provide push-pull signal output.

10. A push-pull volume compressor comprising two Wheatstone bridge circuits each bridge having one arm composed of a tube with its cathode grounded and having its three other arms composed of resistors, each input terminal being constituted by the resistor junction directly opposite said cathode in each bridge circuit, means for amplifying and rectifying a portion of the push-pull output signal, means for impressing such rectified voltage upon the control grid of said tubes in opposition to a pre-determined bias potential applied to the control grid of said tube so as to vary the plate resistance of both tubes inversely with the intensity of such signal, a pair of tubes cathode coupled through a common resistor, means for feeding the signal taken from the anode of the tube in one of said Wheatstone bridge circuits to the control grid of one of said cathode coupled tubes, means for feeding the signal taken from the resistor junction opposite the anode of the tube in said bridge to the control grid of the other of said cathode coupled tubes, and means for taking the signal output from the anode of the cathode coupled tube whose control grid is connected to the anode of the tube in said bridge circuit, the second Wheatstone bridge being connected to two more cathode coupled tubes in the same manner as the first Wheatstone bridge and its associated cathode coupled tubes, thus providing a second output terminal which together with the first output terminal provide push-pull signal output.

11. A push-pull volume compressor comprising two Wheatstone bridge circuits each bridge having one arm composed of a tube with a grounded cathode and having its other three arms composed of resistors, each input terminal being constituted by the resistor junction directly opposite said cathode in each bridge circuit, two cathode follower circuits for applying a signal at each of said bridge input terminals, means for amplifying and rectifying a portion of the push-pull output signal, means for impressing such rectified voltage upon the control grid of said tubes in opposition to a pre-determined bias potential applied to the control grid of said tube so as to vary the plate resistance of both tubes inversely with the intensity of such signal, a pair of tubes cathode coupled through a common resistor, means for feeding the signal taken from the anode of the tube in one of said Wheatstone bridge circuits to the control grid of one of said cathode coupled tubes, means for feeding the signal taken from the resistor junction opposite the anode of the tube in said bridge to the control grid of the other of said cathode coupled tubes, and means for taking the signal output from the anode of the cathode coupled tube whose control grid is connected to the anode of the tube in said bridge circuit, the second Wheatstone bridge being connected to two more cathode coupled tubes in the same manner as the first Wheatstone bridge and its associated cathode coupled tubes, thus providing a second output terminal which together with the first output terminal provide push-pull signal output.

PETER J. CULICETTO.

REFERENCES CITED

The following references are of record in the file of this patent:

UNITED STATES PATENTS

| Number | Name | Date |
|---|---|---|
| 2,305,307 | Wellenstein et al. | Dec. 15, 1942 |
| 2,372,243 | Wulfsberg | Mar. 27, 1945 |
| 2,440,283 | Levy | Apr. 27, 1948 |